May 7, 1935.   R. A. DUNNAM   2,000,129
GROOVING MACHINE
Filed April 14, 1934   2 Sheets-Sheet 1
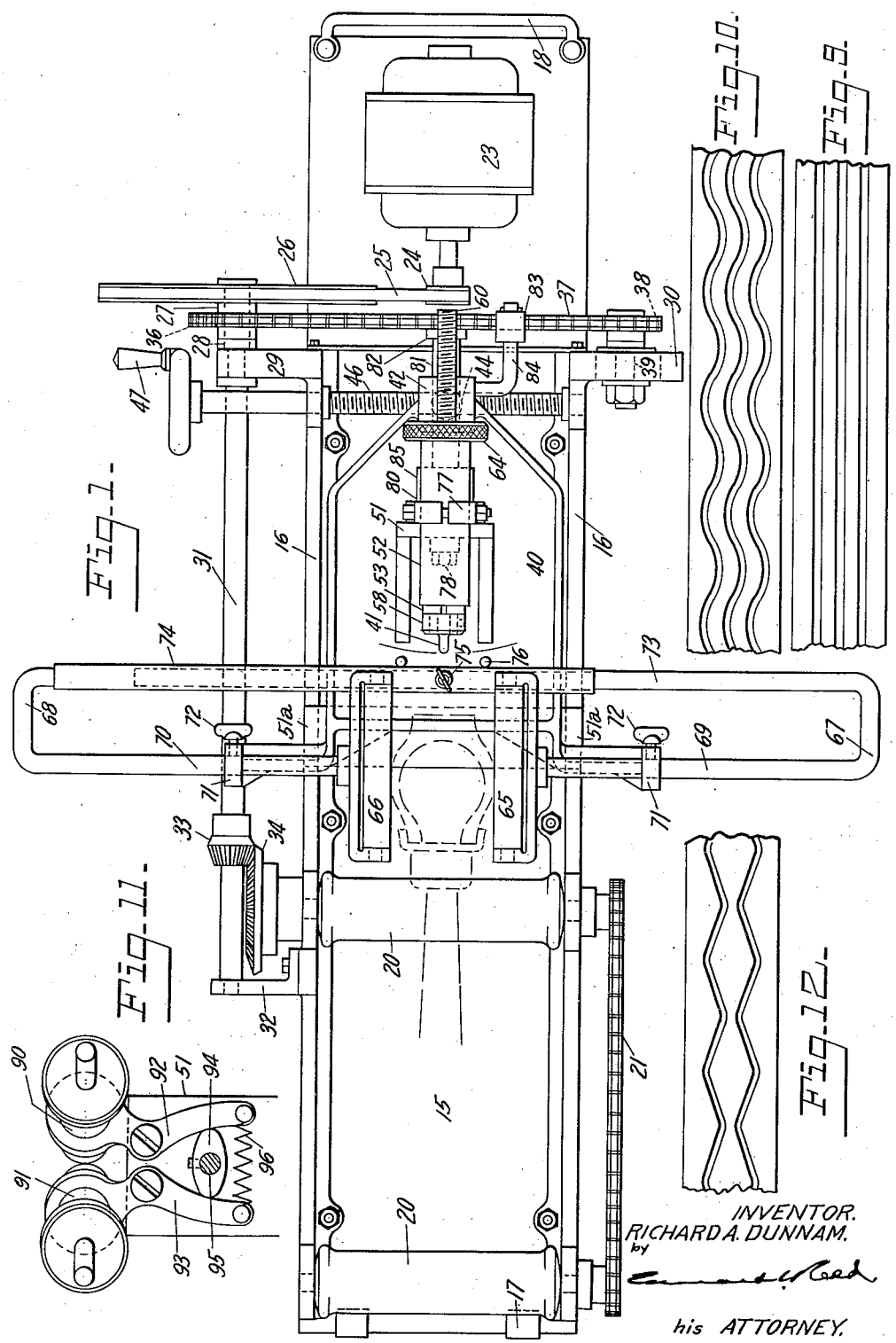
INVENTOR.
RICHARD A. DUNNAM.
by
his ATTORNEY.

May 7, 1935.  R. A. DUNNAM  2,000,129
GROOVING MACHINE
Filed April 14, 1934   2 Sheets-Sheet 2
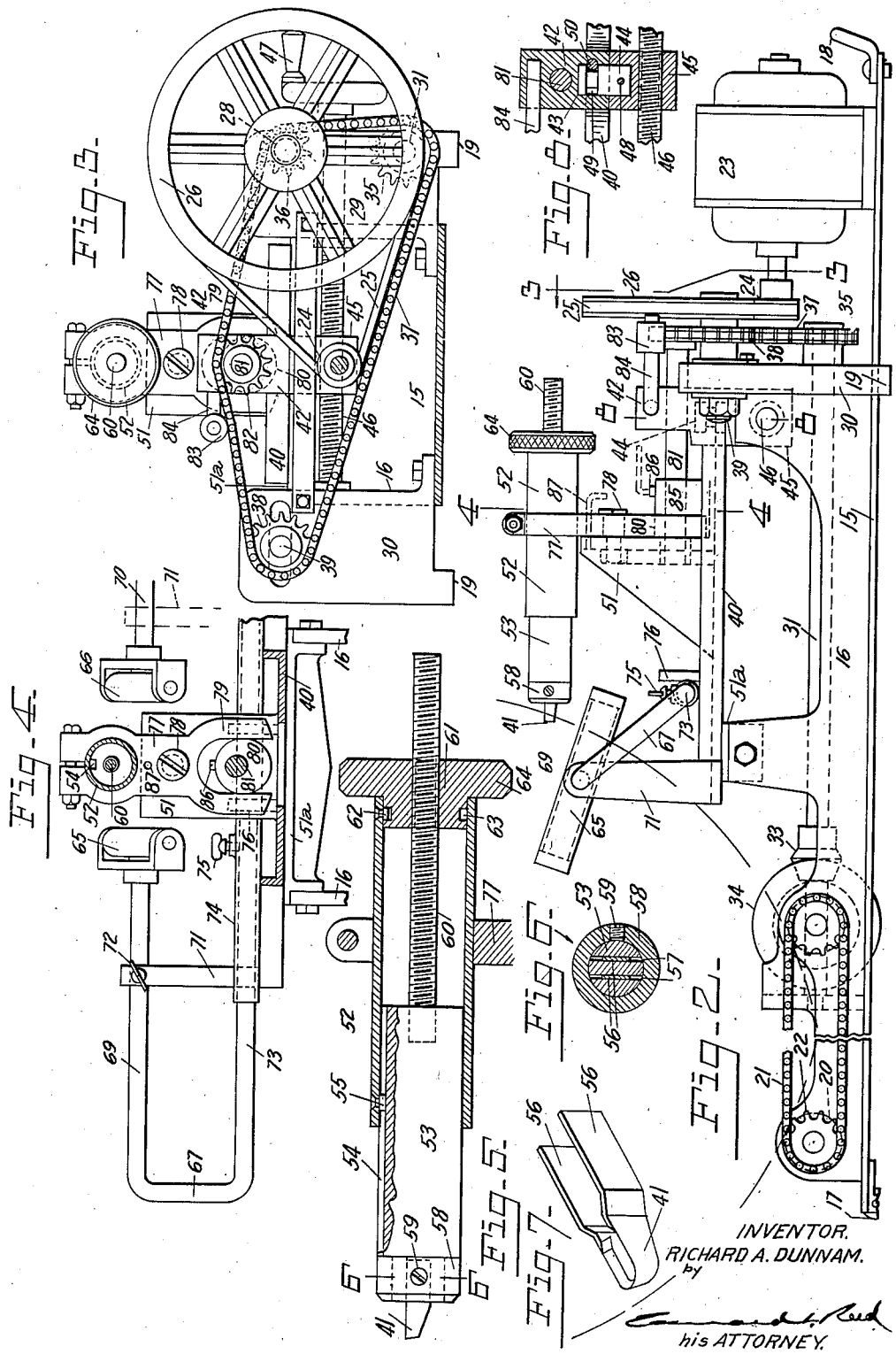
INVENTOR.
RICHARD A. DUNNAM.
by
his ATTORNEY.

Patented May 7, 1935

2,000,129

UNITED STATES PATENT OFFICE 2,000,129

GROOVING MACHINE

Richard A. Dunnam, Dayton, Ohio

Application April 14, 1934, Serial No. 720,547

22 Claims. (Cl. 82—4)

This invention relates to a grooving machine and is designed primarily for regrooving the periphery of an automobile tire after the original tread has worn away to such an extent as to obliterate the grooves therein and to thereby provide the tire with a new nonskid tread.

One object of the invention is to provide a grooving machine which can be quickly and easily moved into operative relation to any wheel of an automobile without moving the wheel from the automobile.

A further object of the invention is to provide a grooving machine which can be readily adjusted to accommodate the same to tires of different sizes.

A further object of the invention is to provide a grooving machine having means for automatically controlling the contour of the groove.

A further object of the invention is to provide a grooving machine having means for maintaining the cutter in proper relation to the periphery of the tire in the event the wheel is out of line and the tire does not rotate in a true plane.

A further object of the invention is to provide a grooving machine which will contain within itself means for rotating the tire and for automatically controlling the operation of the cutter.

Other objects of the invention will appear as the machine is described in detail.

In the accompanying drawings Fig. 1 is a top plan view of a grooving machine embodying my invention; Fig. 2 is a side elevation of such a machine, partly broken away; Fig. 3 is a section taken on the line 3—3 of Fig. 2; Fig. 4 is a section taken on the line 4—4 of Fig. 2; Fig. 5 is a longitudinal section, partly in elevation, of the cutter supporting device; Fig. 6 is a transverse section taken on the line 6—6 of Fig. 5; Fig. 7 is a detail view of the cutter; Fig. 8 is a section taken on the line 8—8 of Fig. 2; Fig. 9 is a view of a portion of a tire tread having straight grooves; Fig. 10 is a view of a section of a tire tread having sinuous grooves; Fig. 11 is a view showing a cutting device for simultaneously forming two grooves; Fig. 12 is a view of a portion of a tire tread showing grooves formed by the device of Fig. 11.

In these drawings I have illustrated the preferred embodiment of my invention but it will be understood that the mechanism may take various forms and that while the present machine is designed for grooving tires the machine may be used for various purposes and the term "tire" as hereinafter used is intended to include any device capable of being operated upon by the machine and the term "cutter" is intended to include any tool for operating on such a device.

In the particular embodiment here illustrated the several parts of the mechanism are mounted on a single supporting structure which comprises a base 15 and longitudinally extending upright members 16. Preferably this supporting structure is provided at its forward end with small wheels or rollers 17 and at its rear end with a handle 18, whereby the machine may be readily moved from one position to another. The rear end of the base may rest upon the ground or floor but, as here shown, it is provided with feet 19 spaced a short distance from the rear end thereof to maintain the base substantially level. If desired, the supporting structure and various parts of the mechanism may be formed from an aluminum composition so that the machine will be of a relatively light weight and easily handled.

The supporting structure is provided with means for engaging and rotating the tire which is to be grooved. Ordinarily the wheel on which the tire is mounted will not be removed from the automobile but will merely be jacked up to elevate the tire and permit the rotating device to be moved into driving relation thereto. It will be obvious, however, that the tire may be rotatably supported in any suitable manner. In the present instance, the forward portion of the supporting structure is adapted to be positioned beneath the elevated tire and this forward portion is provided with spaced rollers 20, there being in the present instance two of these rollers spaced apart to engage the periphery of the tire at points spaced some distance on the respective sides of the vertical diameter of the tire. When the tire rotating rollers have been placed beneath the elevated tire the latter is lowered into engagement with the rollers so that it will rest thereon with sufficient weight to cause it to be rotated by the rollers. The tire rotating device may be actuated in any suitable manner. In the present instance, both rollers are positively driven and are connected one to the other by a sprocket chain 21 which passes about sprocket wheels 22 on the shafts of the respective rollers. Any suitable driving mechanism may be provided for actuating the rollers but preferably a motor, such as an electric motor 23, is mounted on the rear portion of the supporting structure and is operatively connected with the rear roller 20. In the present arrangement a pulley 24 on the motor shaft is connected by a belt 25 with a large pulley 26 carried by an elongated hub or sleeve 27 which is rotatably mounted on a stud shaft 28 carried by the supporting structure at one side of the base. In the construction shown the upright members 16 are provided at their rear ends with laterally extending flanges 29 and 30, on the lower ends of which the feet 19 are formed, and the stud shaft 28 is mounted in the flange 29. A driving shaft 31 extends longitudinally of the supporting structure and is journaled at its rear end in the flange 29 and at its forward end in a bracket 32 forming part of the supporting structure. Near its forward end this shaft has secured thereto a beveled pinion 33 which meshes with a beveled gear 34 on the shaft of the rear roller 20. Near its rear end the shaft 31 has secured thereto a sprocket wheel 35, and the hub 27 of the pulley 26 has secured thereto a sprocket wheel 36. The sprocket wheels 35 and 36 are connected by a sprocket chain 37 which, in the present mechanism, also has additional functions which will hereinafter appear and is therefore extended transversely to the supporting structure and about a sprocket wheel 38 mounted on a stud 39 carried by the flange 30 of the other upright member 16. Thus the rollers 20 are driven from the motor 23 at a reduced speed.

A cutter for forming the groove is mounted on the supporting structure to the rear of the tire rotating device and is capable of movement transversely to the tire to control its position with relation thereto, and to permit it to be adjusted to different positions to form a series of grooves. In the particular construction illustrated a member 40, which extends lengthwise of the supporting structure, is pivotally supported at its rear end and carries the cutter, which is shown at 41. The pivotal movement of the member 40 permits the cutter to reciprocate laterally with relation to the tire to maintain it in the desired relation thereto and this member is also adjustable bodily transversely to the supporting structure to locate the cutter in different positions with relation to the periphery of the tire. In the present instance, the member 40 is in the form of a plate, the rear portion of which is tapered rearwardly and is provided with a vertical bearing block 42 at its rear end, which may if desired be formed integral with the plate and which is provided in its lower end with a bearing recess 43 adapted to receive a pivot pin 44 which is carried by a laterally adjustable part of the supporting structure. As here shown this laterally adjustable part is in the form of a nut 45 mounted on a screw threaded shaft 46 which is journaled in the side members 16 of the structure and is provided at one end with a handle 47 by means of which it may be rotated. The pivot pin 44 is seated in a recess in the upper end of the nut 45 and is rigidly secured therein, as by means of a pin 48. Preferably the upper end of the pivot pin which extends into the bearing block 42 is provided with a circumferential groove 49 to receive a locking pin 50 and thus retain the pin in the bearing recess 43 without interfering with the rotation of the bearing on the pivot pin. The forward portion of the member or plate 40 may be supported in any suitable manner for lateral movement about the pivotal axis of the plate and, as here shown, it is slidably supported on a transverse bar or track 51a carried by the side members 16. The operation of the screw shaft 46 serves to move the member 40 transversely to the supporting structure to locate the same in different positions with relation to the periphery of the tire to form successive grooves therein. The pivotal movement of the plate serves to control the position of the cutter with relation to the periphery of the tire during the cutting operation.

The cutter is so arranged on the plate 40 that it can be moved into and out of operative engagement with the periphery of the tire and may, further, have a fore and aft movement sufficient to accommodate the same to tires of different diameters. As here shown, the member 40 is provided with an upwardly extending bracket 51 and mounted on this bracket, in a manner to be hereinafter described, is a cutter supporting device, shown in detail in Fig. 5. This device comprises a tubular member 52 supported on the bracket, and slidably mounted in this tubular member is a cutter supporting member 53 having a longitudinal groove 54 to receive a stud 55 carried by the tubular member and serving to hold the cutter supporting member 53 against rotation. The cutter may be mounted on the forward end of the member 53 in any suitable manner but the present cutter, as shown in Fig. 7, has a pair of rearwardly extending parallel arms 56 and the forward end of the slidable member 53 is provided with slits 57 forming kerfs to receive the arms 56 of the cutter. Preferably this forward end of the member 53 is reduced in diameter and a collar 58 is mounted about the same. A set screw 59 extends through the collar 58 and engages the split end of the member 53 to press the several parts thereof together and thus firmly clamp the cutter arms in the kerfs, the screw also serving to retain the collar in its proper position on the member 53. The cutter supporting member 53 may be adjusted lengthwise in any suitable manner, as by providing the same with a screw threaded rod 60 which extends rearwardly through a nut 61 rotatably mounted in the rear end of the tubular member 52 and held against axial movement with relation thereto by a stud 62 which extends into a groove 63 in that portion of the nut which extends into the tubular member. The rear portion of the nut is enlarged to provide a knurled head 64 by means of which it may be rotated. Thus when the tire rotating device has been placed in operative relation to the tire the cutter is adjusted to proper cutting position with relation to the tire and the motor operated to cause the tire to rotate against the cutter and to thereby form the groove.

It not infrequently happens that the tire which is to be grooved will not rotate in a true plane due to the fact that either the wheel or the tire is out of alinement. If the cutter remained in a fixed position the wobbling movement of the tire, due to the fact that it is not rotating in a true plane, would cause the groove to be spaced different distances from the lateral edge of the tread which, of course, is undesirable. In order to maintain the cutter in such a position with relation to the tire that the groove will be spaced a proper distance from the side of the tire throughout the circumference of the same I have provided means controlled by the tire itself to maintain the cutter in a proper position to accomplish this result. For this purpose tire engaging devices 65 and 66, here shown as rollers, are arranged to engage the respective sides of the tire and are so connected with the forward end of the member or plate 40 that lateral movement will be imparted to this member according to any deviation of the tire from a true plane and this movement of the member 40 will maintain the cutter at the desired distance from the side of the tire. The tire engaging members 65 and 66 are adjustable with relation one to the other to permit them to be spaced apart to receive tires of different thicknesses, and to facilitate the placing of the same in engagement with the tire, and they are also adjustable as a unit with relation to the member 40 to permit the latter to be adjusted laterally with relation to the tire when a second groove is to be cut. In the particular construction here shown the tire engaging members are carried by U-shaped rods 67 and 68, the forward arms 69 and 70 of said rods being slidably mounted in bearings formed in the upper ends of brackets 71 carried by the member 40, preferably at the forward end thereof, and the rods are held in adjusted positions by set screws 72. The tire engaging members or rollers are mounted on the inner ends of the respective arms 69 and 70. The rear arms 73 and 74 of the two U-shaped rods are connected one to the other for longitudinally relative adjustment. Preferably the arm 74 is tubular in form and the arm 73 is slidably mounted therein and held in adjusted position by means of a set screw 75. The rear arms 73 and 74 are not connected with the member 40 but are free to move transversely thereto, a stop 76 being provided to prevent the tilting movement of the rods. Thus when the machine is to be used the set screws 72 and 75 are released and the tire engaging members separated to permit the same to be placed about the tire and are then moved into light engagement with the respective sides of the tire and the set screws tightened down to maintain them in these positions so that any wobbling movement of the tire will be transmitted to the member 40 and to the cutter 41. When the member 40 is to be moved bodily to position the cutter to form another groove the set screws 72 only are released and the adjustment of the member 40 will cause the same to move with relation to the tire engaging members, and after this adjustment has been made the set screws 72 are again tightened.

When the cutter 41 is held against movement with relation to the member 40 during the cutting operation a straight groove will be formed about the periphery of the tire but usually it is desirable that a part at least of the grooves should not be straight but should be more or less sinuous in character and in order to so form the grooves I have provided means for imparting a lateral reciprocatory movement to the cutter with relation to the member 40 during the cutting operation, this movement being so controlled as to impart the desired contour to the groove. In the particular arrangement here shown, the cutter supporting device is mounted for oscillatory movement on the bracket 51. To this end an upright device or lever 77 is pivotally mounted between its ends on the bracket 51, as shown at 78. The upper end of this lever is in the form of a split collar which is clamped tightly about the tubular member 52 of the cutter supporting device. The lower end of the lever is bifurcated, as shown at 79, and the two arms of the bifurcations are adapted to receive between them a cam 80. This cam is mounted on a shaft 81 which, in the present instance, is journaled in the bearing block 42 on the plate 40 and extends rearwardly beyond that bearing block and has mounted thereon a sprocket wheel 82 over which the sprocket chain 37 passes, the chain being held in engagement with the sprocket wheel by a roller 83 carried by an arm 84 also mounted in the bearing block 42. Consequently the cam 80 will rotate whenever the motor 23 is in operation and will therefore impart an oscillatory movement to the lever 77 which will cause the cutter to be reciprocated laterally with relation to the tire, while the latter is rotating, thus causing a zigzag or sinuous contour to be imparted to the groove, as shown in Fig. 10, the exact contour of the groove being controlled largely by the shape and timing of the cam. The cam is slidably mounted on its shaft so that it can be moved into and out of operative relation with the bifurcated end of the lever 77 and, as here shown, the hub 85 of the cam is secured to the shaft 81 by a set screw 86 which, if desired, may be provided with a handle to facilitate its operation. By loosening the set screw the cam may be moved rearwardly into an inoperative position and when this is done it is preferable that the lever 77 be positively locked against movement, as by inserting a locking pin 87 through the lever and into the bracket 51.

As shown in Fig. 10 the sinuous grooves are parallel one with the other and in some cases it is desired that the grooves should not be parallel but should be spaced different distances apart at different points in their length, as shown in Fig. 12. To accomplish this I prefer to employ two cutters which act simultaneously on the tire and are moved with relation one to the other to impart the desired contour to the two grooves which are thus simultaneously formed. As shown in Fig. 11, two cutter supporting devices 90 and 91 are mounted on oscillating levers 92 and 93, these levers being pivotally mounted between their ends on the bracket 51. A cam 94 is mounted on the cam shaft 95, which may be actuated in the same manner as the cam shaft 81, and the lower arms of the levers are held in constant engagement with the cam by a spring 96. Thus as the cam rotates the two cutter supporting devices are moved toward and from each other and in order that the cutters may approach relatively close one to the other, as shown by the grooves in Fig. 12, the cutter supporting devices are caused to converge forwardly so that the cutters which project beyond the ends of these devices may be brought into fairly close relation. It will be understood that, if desired, the cutting devices and their actuating cam, as shown in Fig. 11, may be substituted for the single cutting device and the actuating cam of the machine hereinbefore described, without other change in the construction and operation thereof.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a machine for grooving tires and the like, a supporting structure having its front portion adapted to be moved lengthwise beneath a tire, a roller carried by said portion of said structure to engage said tire and rotate the same, a motor mounted on the rear portion of said structure, a cutter supporting device mounted on said structure between said roller and said motor for reciprocatory movement transverse to said structure, a grooving cutter carried by said device and adapted to engage the periphery of a tire which is being rotated by said roller, means driven by said motor to actuate said roller to rotate said tire against said cutter, and means driven by said motor for imparting reciprocatory movement to said cutter supporting device and said cutter to impart a sinuous form to the groove cut by said cutter.

2. In a machine for grooving tires and the like, a supporting structure having its front portion adapted to be moved lengthwise beneath a tire, a roller carried by said portion of said structure to engage said tire and rotate the same, a motor mounted on the rear portion of said structure, a cutter supporting device mounted on said structure between said roller and said motor for reciprocatory movement transverse to said structure, a grooving cutter carried by said device and adapted to engage the periphery of a tire which is being rotated by said roller, means driven by said motor to actuate said roller to rotate said tire against said cutter, means driven by said motor for imparting reciprocatory movement to said cutter supporting device and said cutter to impart a sinuous form to the groove cut by said cutter, and means for adjusting said cutter supporting device transversely to said structure to successively locate said cutter in a plurality of operative positions with relation to the periphery of said tire.

3. In a machine for grooving tires and the like, a laterally adjustable cutter to engage the periphery of a rotating tire, and means controlled by said tire to adjust said cutter at a proper distance from the side of said tire throughout the rotation thereof.

4. In a machine for grooving tires and the like, a cutter mounted for lateral movement with relation to a rotating tire and adapted to engage the periphery of said tire during the rotation thereof, and a device connected with said cutter and having parts to engage the respective sides of said tire to impart lateral movement to said cutter if said tire does not rotate in a true plane.

5. In a machine for grooving tires and the like, a supporting structure, a member mounted on said structure for lateral movement with relation thereto, a cutter carried by said member and adapted to engage the periphery of a rotating tire, and a device connected with said member and having a part to engage the side of said tire and impart lateral movement to said member and said cutter if said tire does not rotate in a true plane.

6. In a machine for grooving tires and the like, a supporting structure, a member pivotally mounted on said structure for movement about a vertical axis, a cutter carried by and movable with said member and arranged at a point spaced from said axis to engage the periphery of a rotating tire, and tire engaging elements mounted on said member and arranged to engage the respective sides of said tire and control the movement of said member about said axis.

7. In a machine for grooving tires and the like, a supporting structure, a member pivotally mounted on said structure for movement about a vertical axis, a cutter carried by and movable with said member and arranged at a point spaced from said axis to engage the periphery of a rotating tire, tire engaging elements mounted on said member and arranged to engage the respective sides of said tire and control the movement of said member about said axis, and means for laterally adjusting said member bodily with relation to said supporting structure.

8. In a machine for grooving tires and the like, a supporting structure, a member pivotally mounted on said structure for movement about a vertical axis, a cutter carried by said member and arranged at a point spaced from said axis to engage the periphery of a rotating tire, tire engaging elements mounted on said member and arranged to engage the respective sides of said tire, and means for laterally adjusting said member bodily with relation to said supporting structure, said tire engaging elements being adjustably connected with said member to permit the latter to be bodily adjusted with relation to the tire.

9. In a machine for grooving tires and the like, a supporting structure, a member pivotally mounted on said structure for movement about a vertical axis, a cutter carried by said member and arranged at a point spaced from said axis to engage the periphery of a rotating tire, tire engaging elements mounted on said member and arranged to engage the respective sides of said tire, and means for laterally adjusting said member bodily with relation to said supporting structure, said tire engaging elements being adjustable with relation one to the other to accommodate them to tires of different widths and being adjustable as a unit with relation to said member to permit the latter to be bodily adjusted with relation to the tire.

10. In a machine for grooving tires and the like, a supporting structure, a member pivotally mounted on said structure for movement about a vertical axis, a cutter carried by said member and arranged at a point spaced from said axis to engage the periphery of a rotating tire, U-shaped bars arranged in opposed relation transverse to said member and each having one arm mounted for longitudinal adjustment on said member, said rods having their other arms connected one to the other for relative longitudinal adjustment, and tire engaging elements carried by the first mentioned arms and arranged on opposite sides of the tire.

11. In a machine for grooving tires and the like, a supporting structure having a laterally adjustable part, a member connected with said part for movement about a vertical axis with relation thereto and for bodily movement therewith, a cutter carried by said member and adapted to engage a rotating tire, and a device carried by said member to engage said tire and move said member about said axis if said tire does not rotate in a true plane.

12. In a machine for grooving tires and the like, a supporting structure, a transverse shaft rotatably mounted on said structure, held against axial movement and having a screw thread, a nut mounted on the screw threaded part of said shaft, a member extending lengthwise of said structure, pivotally mounted at one end on said nut and slidably supported at its other end on said structure, a cutter carried by said member and adapted to engage a rotating tire, and tire engaging elements carried by said member and arranged to engage opposite sides of said tire.

13. In a machine for grooving tires and the like, a supporting structure having a front portion adapted to be positioned beneath a tire, a tire rotating device carried by said portion of said structure, a member mounted on said structure for movement about a vertical axis spaced from the front end of said member and for bodily adjustment transversely to said structure, a cutter carried by said member and arranged to engage a tire which is being rotated by said tire rotating device, and tire engaging elements connected with the front end of said member and arranged on opposite sides of said tire to move said member about said axis if said tire does not rotate in a true plane.

14. In a machine for grooving tires and the like, a supporting structure, a member mounted on said structure for movement about a vertical axis and for bodily movement transversely to said structure, a device mounted on said member for lateral movement with relation thereto, a cutter carried by said device and adapted to engage the periphery of a rotating tire, means for actuating said device to impart lateral reciprocatory movement to said cutter, and a tire engaging device connected with said member to move said member about its axis if said tire does not rotate in a true plane.

15. In a machine for grooving tires and the like, a supporting structure, forwardly converging cutter supporting members mounted on said structure for transverse movement with relation thereto, cutters carried by the forward ends of the respective members and adapted to engage the periphery of a rotating tire, and means for imparting transverse reciprocatory movements to said cutter supporting members.

16. In a machine for grooving tires and the like, a supporting structure, a member carried by said structure, a grooving cutter mounted on said member and adapted to engage the periphery of a rotating tire to cause a groove to be cut therein by the rotation of said tire against said cutter, said cutter being mounted for lateral movement with relation to said member and said tire to impart a sinuous form to said groove, power operated means for imparting relatively short lateral reciprocatory movements to said cutter while said tire rotates, and means for adjusting said member transversely to said tire to move said cutter to a position to cut a second groove in the periphery of said tire in laterally spaced relation to the first mentioned groove.

17. In a machine for grooving tires and the like, a supporting structure, a device carried by said structure to engage the periphery of a tire and rotate the same, a cutter mounted on said structure to engage the periphery of a tire which is being rotated by said device and cause a groove to be cut therein by the rotation of said tire against said cutter, said cutter being movable laterally with relation to said tire to impart a sinuous form to said groove, driving mechanism mounted on said structure and operatively connected with said tire rotating device, means actuated by said driving mechanism to impart lateral reciprocatory movement to said cutter, and means for moving said cutter and its reciprocating means transversely to said tire to a position to cut a second groove in the periphery of said tire in laterally spaced relation with the first mentioned groove.

18. In a machine for grooving tires and the like, a supporting structure, a device mounted on said structure for movement about an axis extending lengthwise of said structure, a cutter carried by said device and adapted to engage the periphery of a rotating tire and cause a groove to be cut therein by the rotation of said tire against said cutter, actuating means to impart oscillatory movement to said device and said cutter to impart a sinuous form to said groove, and means for moving the axis of said device transversely to said tire to locate said cutter in operative relation to another portion of the periphery of said tire.

19. In a machine for grooving tires and the like, a supporting structure, a device mounted on said structure for movement about an axis extending lengthwise of said structure, a cutter mounted on said device in spaced relation to and parallel with said axis and adapted to engage the periphery of a rotating tire to cut a groove therein, and actuating means to impart relatively short oscillatory movements to said device and said cutter.

20. In a machine for grooving tires and the like, a supporting structure, a device mounted on said structure for oscillatory movement about an axis extending lengthwise of said structure, a cutter carried by said device, a cam movable into and out of operative relation to said device, means for rotating said cam, and means for holding said device against oscillatory movement while said cam is in inoperative relation thereto.

21. In a machine for grooving tires and the like, a supporting structure, a member mounted on said structure, means for moving said member transversely to said structure, a cutter supporting device mounted on said member for lateral reciprocatory movement with relation thereto, a cutter carried by said device and adapted to engage the periphery of a rotating tire, means carried by said transversely movable member for actuating said cutter supporting device, a driving element mounted on said supporting structure, and means for establishing a driving connection between said driving element and said actuating means and for maintaining said connection in all positions of said transversely movable member.

22. In a machine for grooving tires and the like, a supporting structure, a member mounted on said structure, means for moving said member transversely to said structure, a cutter supporting device mounted on said member for lateral reciprocatory movement with relation thereto, a cutter carried by said device and adapted to engage the periphery of a rotating tire, means comprising a sprocket wheel mounted on said transversely movable member for actuating said cutter supporting device, other sprocket wheels mounted on said supporting structure on the respective sides of the first mentioned sprocket wheel, a chain extending about the last mentioned sprocket wheels and having a portion thereof in operative relation to the first mentioned sprocket wheel, and means for driving said chain.

RICHARD A. DUNNAM.